United States Patent Office 3,430,751
Patented Mar. 4, 1969

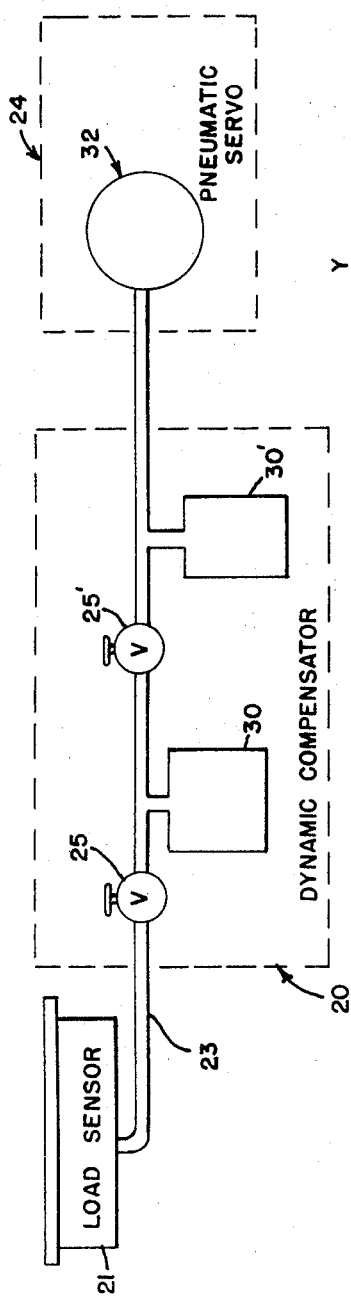
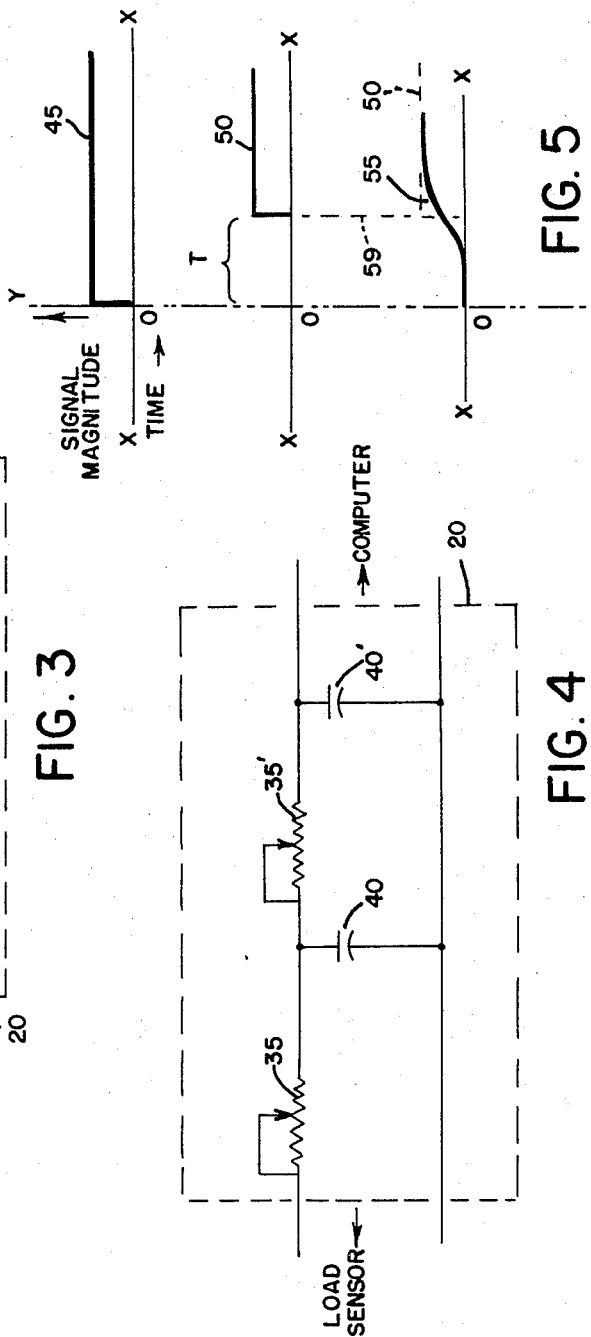

3,430,751
VARIABLE SPEED FEEDER CONTROL
Robert N. Bateson, Minneapolis, Minn., assignor to General Mills, Inc., a corporation of Delaware
Continuation-in-part of application Ser. No. 565,564, July 15, 1966. This application Sept. 28, 1967, Ser. No. 671,359
U.S. Cl. 198—37                 9 Claims
Int. Cl. B65g 47/08, 69/00

ABSTRACT OF THE DISCLOSURE

A feeder or conveyor control system for regulating the mass rate of delivery of material by a conveyor. A dynamic compensator is positioned in the signal path between a mass or load sensor and a computer to delay a signal change to compensate for a time lag between a detected change and the time corrective action is necessary at the delivery point of the conveyor.

---

Figure 1:
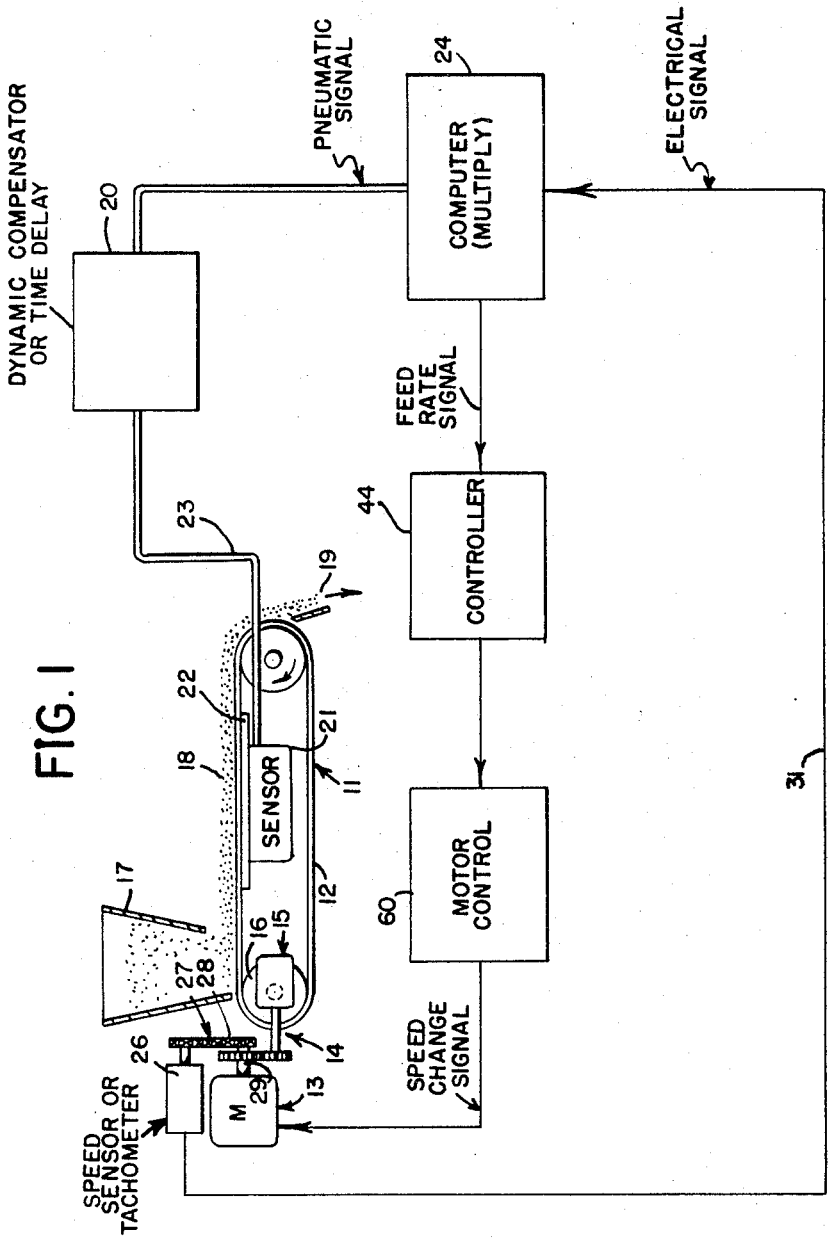

This application is a continuation-in-part of my co-pending application, Ser. No. 565,564, now abandoned, filed July 15, 1966.

This invention relates to a variable speed feeder control and more particularly to an electronic speed control for regulating the mass feed rate of a conveyor which is transporting material.

A conventional feeder or conveyor frequently uses a constant speed conveyor such as a belt conveyor and utilizes an adjustable gate for varying the amount of material placed upon the belt conveyor. The gate is used to adjust the load per foot of conveyor belt required for a desired feed rate assuming a constant density for the load. In the usual system, a weight sensing device normally is physically displaced from the gate so that a time lag will occur between the time that the material is metered by the gate and the time that the sensing device measures the load on the belt. This time lag is determined by the physical separation of the gate and the sensing device and the speed of the belt. This physical separation results in a time lag which makes the measurement and ultimate control of the feed rate at the discharge end of the belt difficult. The difficulty is amplified if the feed rate is low and where the belt speed must be low due to some feeding requirement.

Further, in the usual system there is also a time lag between the time an error signal is detected by a load sensor and the time that the error load is discharged from the conveyor. In the usual system which is used in connection with measuring particulate materials such as food products, iron ore and other dry particulate material, the permissible error is sufficiently large so that these time lags can be disregarded. Difficulty and poor quality of a finished product occur, however, when the quality control standards are increased for a finished product formulated by such a conventional system.

Another problem encountered in conventional feeder systems where highly accurate control is needed, is self oscillations generated due to the instability of the control network. Thus, normal feeders have an accuracy limit as a result of the instability of the system.

It is therefore an object of the present invention to provide a new and improved variable speed feeder control, It is another object of the present invention to provide a new and improved variable speed feeder control having improved stability, It is yet another object of the present invention to provide a new and improved variable speed feeder control having rapid and accurate correction response to changes in feed rate.

It is another object of the present invention to provide a new and improved variable speed feeder control having highly accuratae control of the feed rate.

It is a further object of the present invention to provide a new and improved variable speed feeder control having a dynamic compensator to insure highly accurate control of the feed rate.

A system illustrating certain features of the invention may include a load sensor for sensing the material load per linear foot of the conveyor. The sensor generates a signal indicative of the load. A conveyor speed sensor is utilized to sense the rate of conveyance of material by the conveyor and the signals from the speed sensor and load sensor are multiplied by a computer to generate a feed rate signal which is indicative of the movement of a specified quantity of material in a predetermined time. A dynamic compensator is used to delay the signal from the load sensor so timed control of the speed of the conveyor is possible. The feed rate signal is therefore a delayed signal. The feed rate is then compared by a controller to a standard desired feed rate. The controller generates an error signal to control a drive mechanism for the conveyor.

Figure 2:
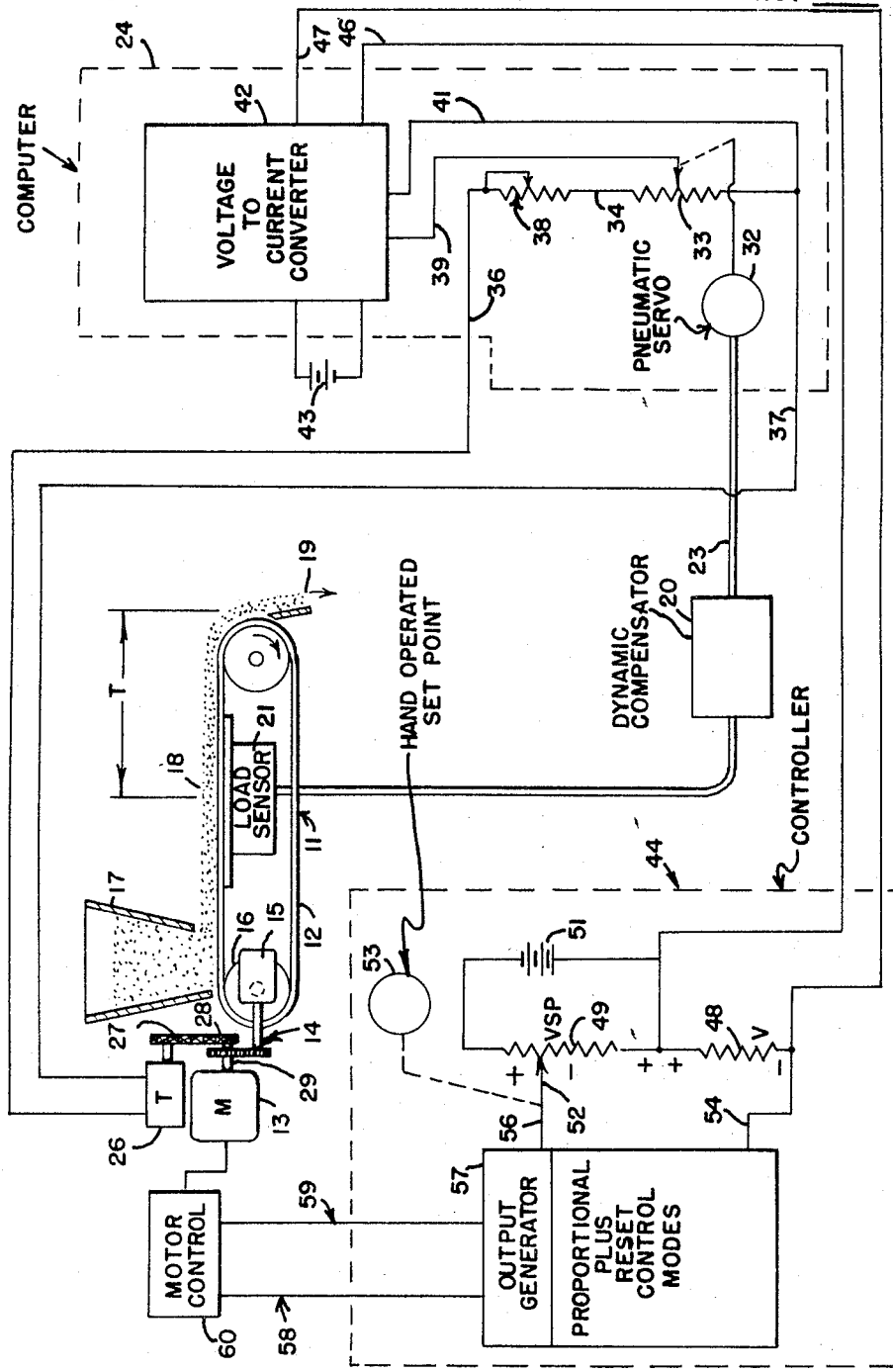

A more complete understanding of the invention may be obtained from the following detailed description of a variable speed feed control forming a specific embodiment, when read in conjunction with the drawings in which;

FIGURE 1 is a block diagram of a feed rate control,

FIGURE 2 is a detailed circuit diagram of the feed rate control system disclosed in FIGURE 1, FIGURE 3 is a partial circuit diagram illustrating a pneumatic dynamic compensator shown in FIGURES 1 and 2, FIGURE 4 is a partial circuit diagram illustrating an electrical dynamic compensator, and FIGURE 5 is a signal response chart with signal magnitude extending along the Y axis and time extending along the X axis.

Refer first to FIGURE 1 of the drawings which is a block diagram of the control system connected to a belt conveyor. The conveyor generally designated by the numeral 11 may be illustrated as a belt conveyor having a belt 12 driven by a motor, preferably an electric motor 13, through a gear system 14 which is connected to a gear system 15. Gear system 15 is geared to operate the drive pulley 16 of the conveyor 11 at a predetermined rate of speed so that belt 12 achieves the desired and controllable linear velocity.

Mounted above the conveyor 11 is a hopper 17 which contains a solid particulate material 18. This material is fed onto the belt 12 and is conveyed to the discharge end 19 of the conveyor 11.

A sensor 21 is mounted near the belt 12 of conveyor 11 and it contains a load sensor 22 which is in contact with belt 12. This sensor 21 senses the weight of material on the belt 12 as the belt carries the mass of material 18 past the load sensor 22. The load sensor 21 senses the weight of material per unit length of the belt 12. Preferably, load sensor 21 is a pneumatic sensor which generates a pneumatic signal indicative of the weight per unit length of the material on the belt. Load sensor 21 is commercially available in the preferred form as a pneumatic sensor but in some cases where all the advantages of a pneumatic sensor are not needed, it may also be one of several other commercially available types of load sensing devices. The pneumatic signal generated by sensor 21 which is indicative of the load per foot of the belt 12 is transmitted via pneumatic line 23 to a computer 24. Computer 24, in the preferred form, is an analog computer which is capable of responding to a pneumatic signal from pneumatic load sensor 21.

If an electrical signal to computer 24 is desired, then a signal converter may be placed in line 24 or a load sensor 21 may be selected which has an electrical output signal.

Between the time that the load sensor 21 detects a need for a change in the speed of conveyor 11 to maintain the proper mass rate flow and the time that the material is discharged at end 19, a time period of T will have elapsed. Therefore the signal from load sensor 21 should preferably be delayed for time period T to insure that a change in the speed of conveyor 11 does not occur before the tested load arrives at the discharge end 19. A dynamic compensator 20 (see FIGURE 1) is therefore placed in line 23 to delay the signal from load sensor 21 for a sufficient period of time so that a subsequent change in the speed of conveyor 11 will coincide with the arrival of the tested material at discharge end 19. A pneumatic dynamic compensator and an electrical dynamic compensator are illustrated in FIGURES 3 and 4 respectively. The dynamic compensator is essentially a filter, whether pneumatic or electrical which in the present application delays the signal from the load sensor for a time period proportional to the linear velocity of the conveyor belt. In the pneumatic dynamic compensator illustrated in FIGURE 3, a valve 25 which restricts gas flow is placed in the line 23. A capacitance tank 30 is connected to line 23 to complete one stage of the compensator. The pneumatic dynamic compensator in the preferred form is completed by a similar stage having a valve 25′ and a capacitance tank 30′. Another embodiment of a dynamic compensator can be obtained using only a single valve and capacitance tank.

The electrical embodiment of the pneumatic dynamic compensator is shown in FIGURE 4. A resistor 35 is placed in series in the electrical circuit and a capacitor 40 is placed in parallel. This combination is repeated in resistor 35′ and capacitor 40′ to form an electrical dynamic compensator. The valves and resistors of the respective compensators are adjustable so that the compensators can be tuned and/or adjusted.

FIGURE 5 of the drawings illustrates the function of the dynamic compensator 20 in the system. The Y axis represents signal magnitude. The magnitude of the curve 45 is an indicated belt loading change needed as detected by load sensor 21. The X axis represents time. Curve 45 is a representation of an ideal signal indicative of a load variation which requires a change in belt speed. Curve 50 is a representation of an ideal signal ordering a belt speed change where the signal has been delayed for a time T. The time T represents the delay necessary to coordinate the change in belt speed with the discharge of the measured load on the belt 11. An ideal signal represented by curve 50 would have a square form, however it has been found that such a signal wave form is difficult and expensive to achieve and therefore a signal having a form of curve 55 has been found to be effective. Curve 55 therefore represents the actual signal directing the increase in belt speed which has a delay time as indicated by dotted line 59.

The dynamic compensator 20 also performs the function of a filter and thereby inhibits or eliminates the development of self oscillation which might also develop in the system. Self oscillations constitute a noise signal and therefore are undesirable.

A speed sensor 26 is connected to the coveyor 11 through a timing belt mechanism generally designated by the numeral 27 and includes a timing belt 28 which is connected to a timing sprocket on motor shaft 29. This speed sensor is calibrated to indicate the linear velocity of the belt 12 of the conveyor 11. In the preferred form, this speed sensor may be simply a tachometer which is commercially available and which generates an electrical signal indicative of the linear velocity of the belt 12. The electrical signal from the speed sensor 26 is fed into the computer 24 as indicated by the line 31.

The computer 24 is preferably an analog computer but it may also be a digital computer. The computer 24 in the preferred form is capable of handling an input signal which is a pneumatic signal from the load sensor 21 and an electrical signal which is an input signal from the speed sensor 26. The computer in this situation is a multiplier and is more specifically illustrated in FIGURE 2 of the drawings. The computer 24 is illustrated by the circuit diagram enclosed within the dotted lines of FIGURE 2. The pneumatic signal on line 23 is fed into a pneumatic servo 32, a commercially available piece of equipment which controls the slide 33 of a potentiometer 34. The electrical signal from the speed sensor 26 is in the form of a voltage signal and is applied across the potentiometer 34 by lines 36 and 37. A span resistor 38 may be used in series with the potentiometer to control the magnitude of the voltage drop across the potentiometer 34.

Thus, with the voltage signal applied across the potentiometer 34 which in turn is controlled by the time delayed pneumatic signal on line 23, the resulting output is a multiplication of the electrical signal from the speed sensor 26 and the time delayed pneumatic signal from the load sensor 21. This electrical output, a voltage output, appears across lines 39 and 41. This output signal is fed into a voltage to current converter 42. This is a commercially available piece of equipment and is designed to convert the voltage signal across lines 39 and 41 to a current signal output. Battery 43 is a power source for the voltage to current converter 42. The output from this voltage to current converter 42 is the output of the computer 24 and appears as a feed rate signal.

The feed rate signal is an indication of the pounds of material 18 per unit length of the belt 12. This can be calculated since the feed rate signal is the product of the electrical signal and the pneumatic signal. The pneumatic signal is an indication of pounds per foot on the belt 12 of the conveyor and the electrical signal is an indication of the feet per minute of belt 12. The product of this is pounds per minute. Accordingly, the feed rate signal is an indication of the number of pounds of material 18 being discharged at the discharge end 19 of the conveyor 11.

This feed rate signal which contains the time delay factor is then fed into a controller 44 indicated in FIGURE 1. In FIGURE 2, it will be observed that the feed rate signal appears across lines 46 and 47 and is applied to a commercially available electronic controller 44 shown in more detail enclosed within a dotted box. The current signal is applied across a resistor 48 where a voltage is developed with a potential polarity as indicated on the drawing of FIGURE 2. Resistor 48 is connected to a potentiometer 49 across which a voltage source 51 is applied so that the voltage drop across the potentiometer 49 is opposed to the voltage drop across resistor 48. The slide 52 of the potentiometer is controlled by a hand operated mechanism 53 so that a predetermined set point can be selected by an operator. This set point is used to establish the desired feed rate for the conveyor 11. The desired feed rate appears across the potentiometer 49 as a voltage magnitude against which the voltage developed across resistor 48 in compared. The resulting signal output across lines 54 and 56 is an error signal which is the difference between the set point voltage generated across the potentiometer 49 designated as $V_{SP}$ and the voltage developed across the resistor 48 (designated as V). The error signal will vary from 0 to some positive or negative voltage value. The 0 condition occurs if the voltage developed across resistor 48 exactly equals the voltage developed across the potentiometer 49 as selected by the operator of mechanism 53. This error signal is applied to the output generator 57, the second part of the controller. The most desirable controller is one with adjustable proportional and reset control modes. The output of the controller is an electrical current signal on lines 58 and 59. This current signal is applied to a motor control 60.

The motor control 60 is a commercially available piece of equipment which is designed to produce an electrical signal capable of controlling the speed of an electric motor 13. This speed signal generated by the motor control 60 is responsive to the output signal generated by the controller 44.

Consequently, the conveyor 11 is controlled accurately by the use of signals from the load sensor 21 and the speed sensor 26. A pre-selected set point may be programmed into the controller 44 for comparison with the feed rate signal so that the output of material 18 in pounds per minute from the conveyor 11 can be accurately selected depending upon the material delivery rate desired. For example, if the material being carried by the belt 12 is to be mixed with another material which may be fed to a common receptacle by another similar such conveyor, the feed rate of the conveyor 11 can be accurately selected by simply selecting the proper set point in controller 44. Any change in the output requirement from the conveyor 11 can be adjusted by merely selecting a different set point for the controller 44. Accordingly, any desired mixture of ingredients can be achieved by accurately controlling the conveyor speed by utilizing the set point control of controller 44.

It is to be noted here that the sensor 21, line 23, and compensator 20 may be an electrical system. In such a system the computer 24 should be capable of handling two electrical input signals. The preferred embodiment of the invention, however, utilizes a pneumatic signal and an electrical signal.

On an alternate system a digital computer may be used in place of an analog computer for the multiplication of the belt load and belt speed signals. The digital computer can be programmed such that the time lead can be eliminated resulting in a theoretically errorless control system.

It is to be understood that the above described arrangements are simply illustrative of the application of the principles of the invention. Numerous other arrangements may be devised by those skilled in the art which will embody the principles of the invention and which fall within the spirit and scope thereof.

The embodiments of the invention in which an exclusive property or privilege is claimed are defined as follows:

1. A system for controlling mass flow of material on a conveyor which comprises a sensing means associated with said conveyor for sensing the mass of solid material on said conveyor per unit length of said conveyor and for generating an output signal proportional to the mass sensed, a signal delay means connected to said sensing means for delaying the output signal for a time period proportional to the linear velocity of said belt to compensate for the time delay between the time material is sensed on said conveyor and the time the material is discharged from said conveyor, a motor for driving said conveyor at a predetermined controllable speed, a conveyor speed sensor for generating an electrical signal indicative of the conveyor speed, computer means interconnected with said conveyor speed sensor and said signal delay means for generating an electrical output signal which is a multiple of the output signal from said sensing means and the electrical signal from said conveyor speed sensor, a controller connected to said computer means for comparing the signal from said sensing means to a standard signal and for producing an error signal indicative of a corrective speed change for said conveyor, and means interconnecting said controller and said motor for varying the signal to said motor to control the speed of said motor in response to the error output signal of said controller.

2. A system in accordance with claim 1 in which the output signal generated by said sensing means is a pneumatic signal and in which said signal delay means is a pneumatic signal delay means.

3. A system in accordance with claim 1 in which said computer is an analog computer.

4. A system in accordance with claim 1 in which the output signal generated by said sensing means is a pneumatic signal.

5. A system in accordance with claim 1 in which the output signal generated by said sensing means is an electrical signal and in which said signal delay means is an electrical signal delay means.

6. A system in accordance with claim 1 in which said speed sensor is a tachometer and which further includes a timing chain drive connecting said tachometer to the motor and conveyor.

7. A system for controlling mass flow of solid particulate material on a belt conveyor which comprises a load sensor associated with the belt of said conveyor for sensing the mass of particulate material on said conveyor per unit length of said conveyor and for generating an output signal proportional to the mass sensed, a motor for driving said conveyor at a predetermined controllable speed, a conveyor speed sensor for generating an electrical signal indicative of the linear velocity of said belt, a dynamic compensator connected to said load sensor for delaying said output signal for a time period proportional to the linear velocity of said belt, an analog computer interconnecting said speed sensor and said dynamic compensator for generating an electrical output signal which is a multiple of the output signal from said sensing means and the electrical signal from said speed sensor, a controller responsive to the electrical output signal from said computer for comparing said electrical output signal to a standard signal and for producing an error signal indicative of a corrective speed change for said conveyor, and means responsive to said error signal for generating a signal to vary the speed of said motor in response to the error signal of said controller.

8. A system in accordance with claim 7 in which said load sensor is a pneumatic load sensor, in which said dynamic compensator is a pneumatic dynamic compensator and in which said analog computer generates an electrical output signal which is a multiple of a pneumatic signal from said pneumatic dynamic compensator and the electrical signal from said speed sensor.

9. A system in accordance with claim 7 in which said dynamic compensator is adjustable to vary the time period delay of said output signal.

References Cited

UNITED STATES PATENTS

| | | | |
|---|---|---|---|
| 2,909,303 | 10/1959 | Henderson | 198—39 |
| 2,955,206 | 10/1960 | Spergel | 198—39 |
| 2,962,150 | 11/1960 | Haley | 198—39 |
| 3,064,357 | 11/1962 | Butters | 198—39 |
| 3,139,217 | 6/1964 | Mell | 198—39 |
| 3,146,910 | 9/1964 | Varner | 222—55 |
| 3,202,317 | 8/1965 | Fath | 222—77 |

RICHARD E. AEGERTER, *Primary Examiner.*

U.S. Cl. X.R.

198—39